United States Patent [19]

Kamimura et al.

[11] Patent Number: 4,536,811
[45] Date of Patent: Aug. 20, 1985

[54] CASSETTE TAPE PLAYER HAVING SUPPLY AND TAKE-UP MOTORS POSITIONED VERTICALLY ABOVE A CASSETTE RECEIVING MECHANISM

[75] Inventors: Teturo Kamimura; Masahiro Komatsubara; Shizuo Ando; Takugi Inanaga, all of Kawagoe, Japan

[73] Assignee: Pioneer Electronic Corporation, Tokyo, Japan

[21] Appl. No.: 365,564

[22] Filed: Apr. 5, 1982

Related U.S. Application Data

[63] Continuation of Ser. No. 151,980, May 21, 1980, abandoned.

[30] Foreign Application Priority Data

May 22, 1979 [JP] Japan ................. 54-067722

[51] Int. Cl.³ ............................................. G11B 15/00
[52] U.S. Cl. .................................. 360/96.6; 360/96.3
[58] Field of Search ............. 360/96.1, 96.2, 96.3, 360/73, 96.4–96.6

[56] References Cited

U.S. PATENT DOCUMENTS

| | | | |
|---|---|---|---|
| 3,807,654 | 4/1974 | Hall, Sr. | 360/96.1 X |
| 3,855,627 | 12/1974 | Vettore | 360/96.1 X |
| 3,904,149 | 9/1975 | Suzuki | 360/96.5 X |
| 3,916,443 | 10/1975 | Bumb, Jr. et al. | 360/96.1 |
| 3,987,980 | 10/1976 | Sperry | 360/96.1 X |
| 4,213,160 | 7/1980 | Shum et al. | 360/73 |

OTHER PUBLICATIONS

Computer Design, Sep. 1975, vol. 14, No. 9, pp. 94–96, "Smooth Tape Handling . . . ", by S. Davis.

Primary Examiner—John H. Wolff
Attorney, Agent, or Firm—Armstrong, Nikaido, Marmelstein & Kubovcik

[57] ABSTRACT

A motor arrangement for a cassette tape player is provided which comprises a player chassis and a receiving mechanism for receiving a cassette within the chassis in a substantially horizontal position. The cassette has a supply reel hub and a take-up reel hub therein. A cassette drive motor is positioned vertically above the cassette receiving mechanism, and a gearing mechanism transmits the driving force of the supply reel motor and the take-up reel motor to perform the tape supply and tape take-up operations of the received cassette.

1 Claim, 9 Drawing Figures

CASSETTE TAPE PLAYER HAVING SUPPLY AND TAKE-UP MOTORS POSITIONED VERTICALLY ABOVE A CASSETTE RECEIVING MECHANISM

This is a continuation, of application Ser. No. 151,980, filed May 21, 1980, now abandoned.

BACKGROUND OF THE INVENTION

This invention relates to improvements in a cassette tape player of the three-motor type, and more particularly, to a three-motor type cassette tape player suitable for use in automobile audio systems.

For automobile audio systems there are generally used cassette tape players of the slot-in type wherein a cassette is loaded by horizontally inserting it into the player through a slot in a front panel. In general cassette tape players of the three-motor type, separate motors secured to the bottom of a player chassis directly drive two reel shafts extending vertically upward from the associated motors. A guide mechanism is designed so that the cassette is automatically set down to a horizontal play position after it has been inserted through the slot. The reel shafts extend through the reel hubs of the cassette from the underside. The cassette is loaded in place above the drive motors.

When the drive motor operates at the required torque, it inevitably generates heat. This heat will cause tape or a cassette casing to be deformed because the cassette is loaded vertically above the motor. Heat deformation may be avoided by remotely mounting the motor from the cassette with the sacrifice of compactness.

SUMMARY OF THE INVENTION

An object of the present invention is to minimize the influence by heat generation of the motor without increasing the entire size of the cassette tape player.

According to the present invention, in a motor arrangement for a cassette tape player of the three-motor type wherein supply and take-up reel shafts are driven by separate motors, the motors for supply and take-up reel shafts are located vertically above a space for receiving a cassette. The reel shafts extend vertically downward from the associated motors. These motors are preferably secured to the upper wall of a player chassis.

DESCRIPTION OF THE PREFERRED EMBODIMENT

Figure 1:
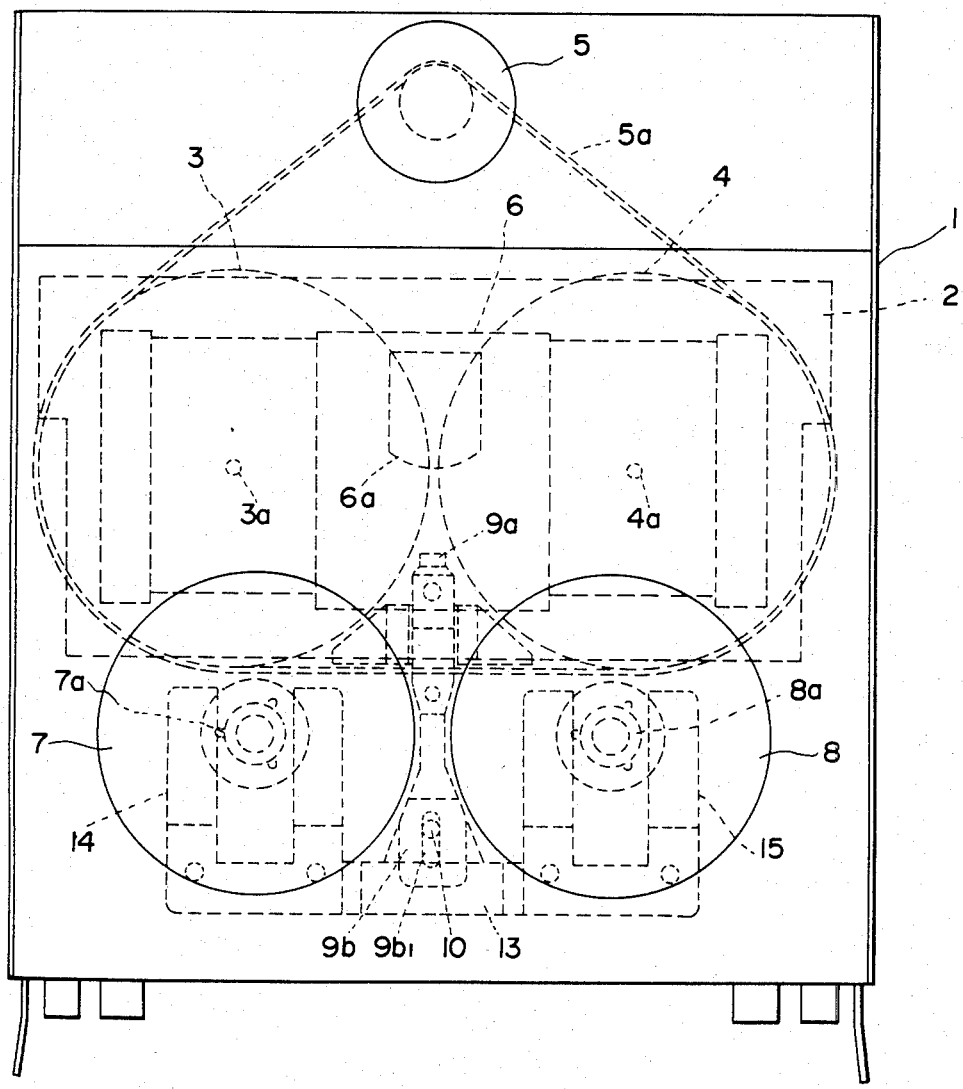
FIG. 1 is a plan view of a cassette tape player according to this invention.

Referring to FIG. 1, the cassette tape player of the present invention comprises a rectangular box-like chassis 1 including upper and lower main walls which are assumed to be horizontal for convenience of description. To the chassis upper wall is secured an attachment plate 2 which has shafts 3a and 4a journalled therein. The shafts 3a and 4a project from flywheels 3 and 4 and form capstans. A motor 5 is fixedly mounted on the chassis 1 and a belt 5a is threaded around a pulley on a drive shaft of the motor 5 and the flywheels 3 and 4. Numeral 6 is a head carriage on which a reproducing head 6a is fixedly mounted. The head carriage 6 is adapted to move forward (downwards in FIG. 1) such that the head 6a is inserted into the head opening in the cassette casing when a cassette is loaded in place. Motors 7 and 8 are mounted on the upper wall of the box-like chassis 1 and have reel shafts 7a and 8a extending vertically downward.

Figure 2:
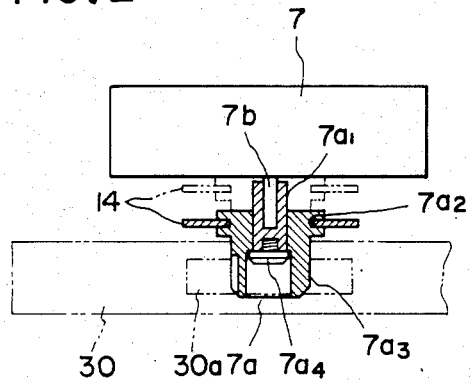
FIG. 2 is a cross section of a movable reel shaft.

FIG. 2 illustrates the construction of the motor 7 and the reel shaft 7a. The reel shaft 7a includes a rectangular box $7a_1$ rigidly secured to a rotating shaft 7b projecting from the motor 7, a reel shaft body $7a_3$ mounted for sliding motion over the boss $7a_1$ and having an annular recess $7a_2$ on the circumference, and a retaining screw $7a_4$ threaded into the end of the boss $7a_1$ to prevent the reel shaft body $7a_3$ from dropping out of the boss $7a_1$. Accordingly, the reel shaft 7a has an axial sliding movement, but is restrained from circumferential rotation in relation to the boss $7a_1$. It will be understood that the reel shaft 8a has the same construction as the reel shaft 7a.

Figure 3:
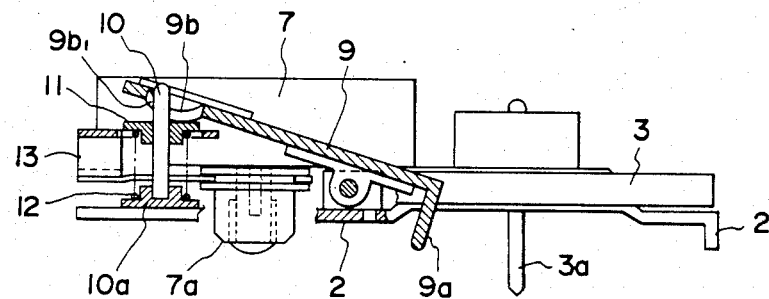
FIG. 3 illustrates the reel shaft and associated parts prior to cassette loading.
Figure 4:
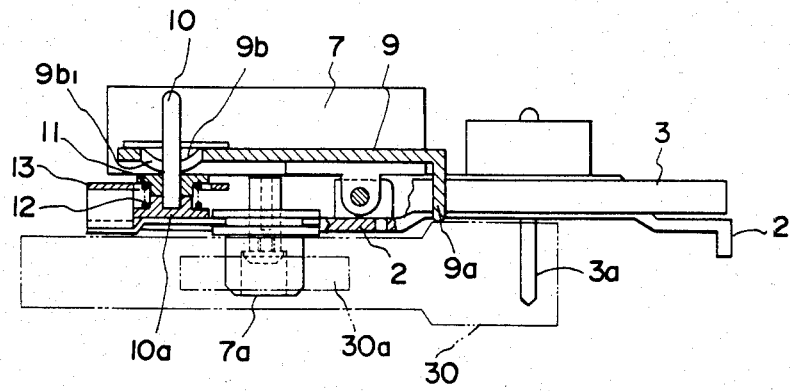
FIG. 4 illustrates the reel shaft and associated parts after cassette loading.

Numeral 9 designates a control plate pivotally mounted to the attachment plate 2 at the center and having a downward projecting tab 9a at one end as shown in FIGS. 3 and 4. Upon cassette loading, this tab 9a is urged upward by a cassette so that the control plate 9 is displaced into a horizontal or parallel position to the main walls. The other end of the control plate 9 is formed into a bent portion 9b having a slot $9b_1$ therein. A guide pin 10 is embedded at right angles in a boss 10a which is secured to the attachment plate 2. The upper end of the pin 10 extends through a bushing 11 and the slot $9b_1$ in the bent portion 9b of the control plate 9. The bent portion 9b abuts the upper surface of bushing 11. The bushing 11 is supported by a spring 12 which is disposed between the bushing 11 and the boss 10a. The bushing 11 fits in an opening in a lever 13 and is rigidly secured to the lever. The lever 13 is thus horizontally held by means of the pin 10, boss 10a, bushing 11 and spring 12. The lateral ends of the lever 13 extend to positions in register with the reel shafts 7a and 8a when projected. A U-shaped leaf spring 14 is secured to the lever end so that a pair of arms of the U spring 14 engage in the reel shaft recess $7a_2$. The same construction applies to a leaf spring 15 and the reel shaft 8a.

Figure 5:
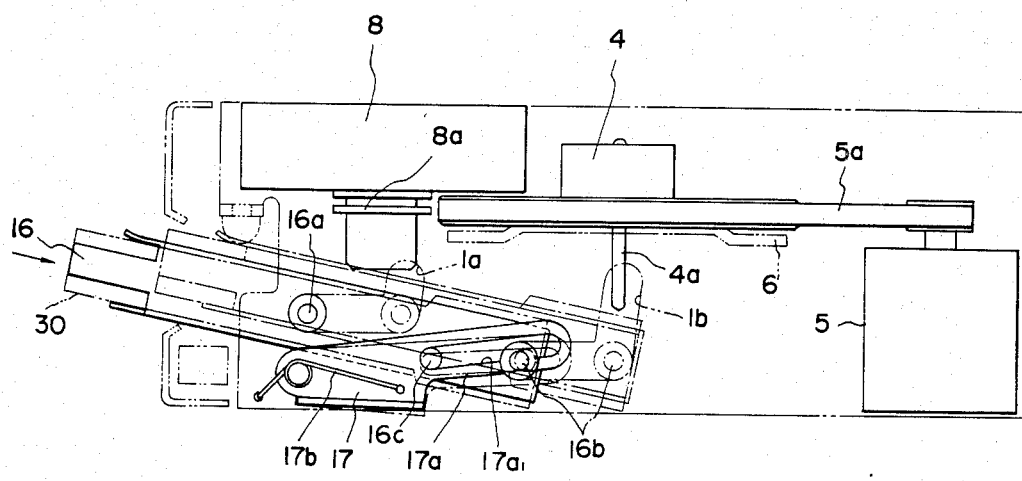
FIG. 5 illustrates a cassette receptacle and guide means prior to cassette loading.
Figure 6:
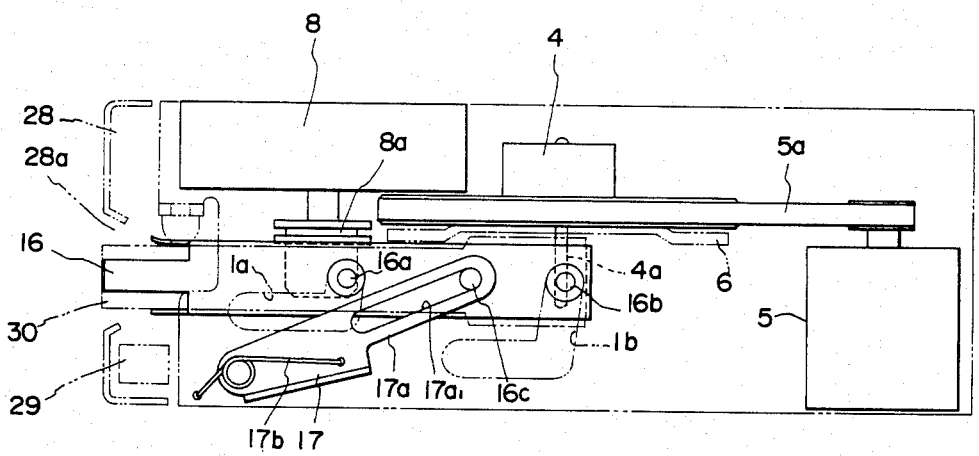
FIG. 6 illustrates the receptacle and guide means after cassette loading.

In side elevations of FIGS. 5 and 6, numeral 16 designates a receptacle in which a cassete 30 is inserted and held in place. The cassette receptacle 16 is provided at either side wall with three pairs of guide rollers 16a, 16b and 16c. The guide rollers 16a and 16b engage in L-shaped guide grooves 1a and 1b in either side wall of the chassis 1, while the remaining pair of guide rollers 16c engage in guide grooves $17a_1$ in biasing members 17 which will be discussed hereinafter. The guide rollers and grooves are positioned such that the cassette receptacle 16 is normally set at an angle with respect to the lower wall of the chassis 1. When the cassette 30 is manually pushed in the direction shown by the arrow in FIG. 5, the cassette receptacle 16 is initially translated in the oblique position along the horizontal portions of the respective guide grooves 16a and 16b and then turned into the horizontal position along the vertical portions of the guide grooves 1a and 1b. The biasing member 17 is pivotally mounted at one end to the side wall of the chassis 1 and biased by a spring 17b in a direction for turning the cassette receptacle 16 into a horizontal position or a counterclockwise direction when viewed in FIGS. 5 and 6. The biasing member 17 has an extension 17a formed with the guide groove 17a$_1$.

It should be noted that the cassette receptacle 16 is biased by a spring (not shown) toward the initial position or to the left when viewed in FIGS. 5 and 6. Further, the vertical portions of the L-shaped guide grooves 1a and 1b are at an angle slightly larger than 90° with respect to their horizontal portions.

Further referring to FIGS. 5 and 6, over the chassis 1 is mounted a front panel 28 having an aperture 28a for allowing insertion of a cassette. Controls 29 including a switch, a volume control, pilot lamps and the like are mounted within the front panel 28 below the cassette insertion aperture 28a. Attachment of electric controls below the aperture 28a will not disturb cassette loading because the space below the trailing edge of the receptacle 16 is not occupied by the receptacle 16 which is translated without changing its oblique position.

With the above-described arrangement, a cassette may be loaded in place as follows.

First, the cassette 30 is inserted into the cassette receptacle 16 through the front aperture 28a. It will be understood that the windowed face of the cassette should be the leading edge in this case. The cassette 30 is manually pushed at its trailing edge to the right, then the receptacle 16 is translated in the oblique position because the guide rollers 16a, 16b and 16c are guided along the horizontal portions of the chassis guide grooves 1a and 1b and the guide grooves 17a of the biasing member 17.

Prior to cassette insertion the control plate 9 is in the slant position as shown in FIG. 3. The spring 12 urges upward the bushing 11 and hence, the lever 13. Then the U-shaped leaf springs 14 and 15 which are rigidly connected to the lever 13 are maintained in the upper position as shown by the dot-and-dash lines in FIG. 2 and holds the reel shafts 7a and 8a in the upper position. Consequently, the reel shafts 7a and 8a are held retracted from the path of the receptacle 16 so that they do not interfere with the receptacle 16 when the receptacle is translated.

After the guide rollers 16a and 16b on the receptacle 16 come to the ends of the horizontal portions of the guide grooves 1a and 1b, the guide rollers 16a and 16b are displaced upward along the vertical portions of the guide grooves 1a and 1b because the receptacle 16 is always urged upward by the biasing force of the spring 17b through the member 17. The receptacle 16 is gradually pivoted about its trailing edge to the horizontal position. The members are designed such that the capstans 3a and 4a are in alignment with the capstan receiving openings in the cassette 30 when the receptacle 16 comes to the end of its translation. With this arrangement, the capstans 3a and 4a do not contact the cassette 30 when the receptacle 16 containing the cassette 30 therein is pivoting. Since the vertical portions of the guide grooves 1a and 1b are at an angle slightly larger than 90° with respect to the horizontal portions, the receptacle 16 is also advanced laterally a small distance when pivoted from the oblique position to the horizontal position. Defferently stated, the receptacle 16 is pivoted about a slightly shifting pivot. This ensures the alignment of the capstans 3a and 4a with the capstan receiving openings in the cassette during pivoting of the receptacle 16 and after the receptacle 16 has been pivoted to the horizontal position.

When the receptacle 16 with the cassette 30 is turned to the horizontal position, the projecting tab 9a of the control plate 9 is raised by the cassette 30. The control plate 9 is rotated counterclockwise from the position of FIG. 3 to the position of FIG. 4 against the action of the spring 12. The control plate bent portion 9b presses downward the bushing 11 and the lever 13 secured thereto. Together with the lever 13, the U-shaped leaf springs 14 and 15 are moved into the lower position shown by the solid lines in FIGS. 2 and 4, and serve to resiliently move down the reel shafts 7a, 8a into opening of cassette reel hubs 30a. Since the reel shafts 7a and 8a are brought into contact with the cassette reel hubs 30a in a resilient fashion, the reel hubs are not damaged by the contact with the reel shafts. In this manner, the capstans 3a, 4a and the reel shafts 7a, 8a are correctly mated in the cassette when the cassette is set at the horizontal position. At this point, the head carriage 6 moves such that the head 6a is inserted into the corresponding window in the cassette 30. A selected one of two pinch rollers (not shown) is brought into pressure contact with the corresponding capstan 3a or 4a and a selected one of the motors 7 and 8 is energized, initiating playback operation.

Next, the ejecting operation is described. An eject lever is mounted on the chassis and operatively connected to the associated members, but not shown in the drawings for simplicity. When the eject lever is operated, the head carriage 6 and the pinch roller are retracted and then the cassette receptacle 16 is turned clockwise in FIGS. 5 and 6. This eject lever is designed to exert sufficient force to lower the receptacle leading edge such that the guide rollers 16a, 16b reach the intersection between the vertical and the horizontal portions of the guide grooves 1a, 1b. When the guide rollers 16a, 16b have moved along the vertical groove portions to the intersection, the receptacle 16 is then returned to the initial position because it is always biased by the spring (not shown). The receptacle 16 resumes its initial position ready for removal of the cassette 30.

The ejecting operation may be carried out in a twostep manner.

A one step operation of the eject lever causes only the head carriage 6 and the pinch roller to be retracted, providing a stop action. A second step operation of the eject lever causes the cassette receptacle 16 to be returned to the initial position, providing an eject operation. An eject lever and a stop lever may be separately provided for these purposes.

Figure 7:
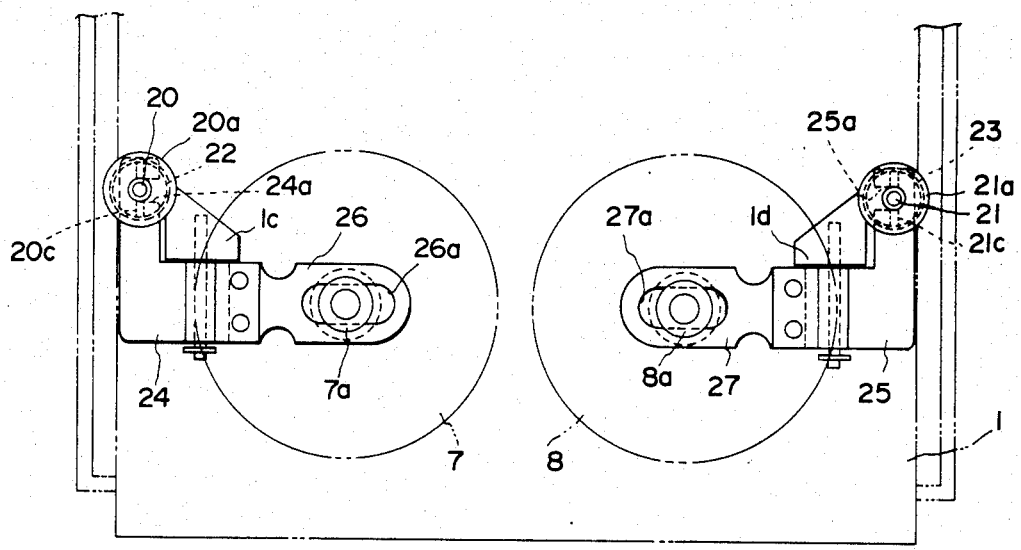
FIGS. 7 and 8 are plan view and side elevation of reel shaft controlling means according to another embodiment of this invention.
Figure 8:
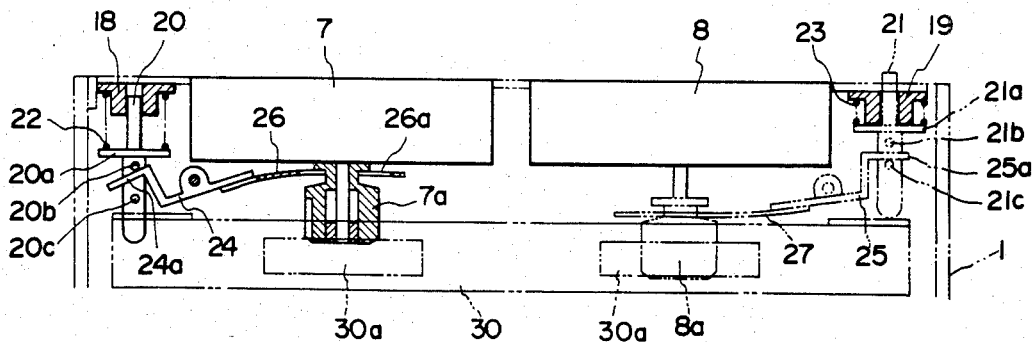

FIGS. 7 and 8 illustrate another embodiment for control controlling the vertical movement of the reel shafts 7a and 8a.

To the upper wall of the chassis 1 is secured a bearing 18 (19) in which a rod 20 (21) is journalled for vertical motion. At the intermediate of the rod there is provided a flange 20a (21a) which coasts with a spring 22 (23) seated on the bearing 18 (19), thereby biasing the rod downward. Below the flange 20a (21a), the rod 20 (21) is provided a with a pair of spaced apart pins 20b, 20c (21b, 21c) projecting perpendicular to the rod axis. A portion of the chassis is cut and bent to form a standing bracket 1c (1d) to which a control plate 24 (25) is pivoted. A forked end 24a (25a) of the control plate 24 (25) engages with the rod 20 (21) between the pins 20b and 20c (21b and 21c). To the other end of the control plate 24 (25) is rigidly secured a leaf spring 26 (27) having a guide slot 26a (27a) formed therein. The inner periphery of the leaf spring 26 (27) defining the slot 26a (27a) is engaged in the recess $7a_2$ in the reel shafts 7a (8a). In this case, the reel shaft body $7a_3$ is composed of two segments which are separated at a position of the recess $7a_2$ and integrally bonded after assembly.

The operation of the other embodiment is now described. The situation prior to cassette loading is illustrated at the left side in FIG. 8. The rod 20 is biased to the lower position by the spring 22 and the forked end 24a of the control lever 24 is pressed downward by means of the pin 20b. That is, the control lever 24 is rotated counterclockwise. As a result, the leaf spring 26 holds the reel shaft 7a to the upper position nearest to the motor 7.

The situation after cassette loading is illustrated at the right side in FIG. 8. The cassette 30 which is loaded in the above-mentioned manner and positioned to the position shown by the dot-and-dash lines abuts the rod 21 at the bottom. The rod 21 is moved upward against the action of the spring 23. The forked end 25a of the control lever 25 is pressed upward by means of the pin 21c. That is, the control lever 25 is rotated counterclockwise in FIG. 8 (the control lever 24 is rotated clockwise). As a result, the leaf spring 27 gradually and resiliently presses down the reel shaft 8a away from the motor 8. The reel shaft 8a is inserted into the opening of the reel hub 30a in the cassette 30.

In general, torques of about 45 gram-centimeter are required for the take-up reel shaft to take up tape from the supply reel through the capstan and the pinch roller. With a motor operating at 1⅓ revolution per second, the mechanical power consumption is calculated to be 0.03–0.01 watt.

Figure 9:
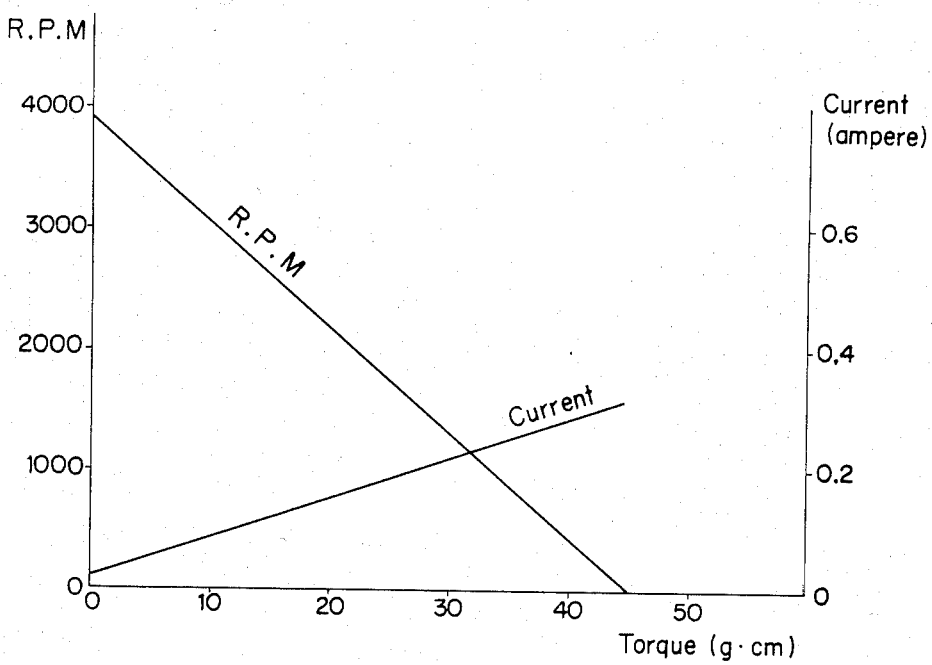
FIG. 9 is a diagram illustrating the characteristics of a motor.

When the reel shaft is directly driven by a motor having the characteristics shown in FIG. 9, the input power amounts to 1.8 watts. Most of this input power is consumed in the form of heat. The heat generated by the take-up reel motor will adversely affect tape or a cassette casing if the cassette is vertically above the motor.

As best shown in FIGS. 2, 4, 6 and 8, the motors 7 and 8 for driving the reel shafts are secured to the upper wall of the chassis and located vertically above the cassette 30 shown by the phantom lines. The reel shafts extend vertically downward from the associated motors. It is to be noted that the reel shaft is usually provided with a safety mechanism for allowing idling of the drive shaft when the reel shaft stops rotating upon termination of tape take-up. Such a slip mechanism is not illustrated in the drawings because it does not constitute part of the present invention. The feature of the present invention resides in that the motors having vertically downward extending reel shafts are located vertically above the space for receiving a cassette. Heat generated by the take-up motor is effectively dissipated, minimizing the influence by heat generation of the take-up motor and avoiding tape and cassette casing deformation. The present invention also permits the motors to be located more adjacent the cassette-receiving space, contributing to a substantial size reduction.

What is claimed is:

1. A motor arrangement for a slot-in type cassette type player for an automobile audio set, said cassette tape player comprising:

a player chassis extending generally horizontally;

a vertical front panel connected to said chassis to form a player structure, said front panel having a cassette insertion aperture therein;

receiving means, inclined with respect to horizontal and having its upper most inclined portion oriented at said insertion aperture, for receiving a cassette having a supply reel hub and a take-up reel hub from outside said player structure, said receiving means being pivotable to pivot said cassette to load it in a substantially horizontal position;

cassette drive means positioned vertically above said cassette receiving means, said drive means including a supply reel motor and a take-up reel motor, each positioned over a respective hub of the cassette when loaded in said horizontal position; and gearing means for providing direct drive between said motors and said cassette, including a supply reel shaft and a take-up reel shaft extending vertically downward from said supply reel motor and said take-up reel motor into said supply reel hub and said take-up reel hub, respectively, of the cassette loaded in said substantially horizontal position.

* * * * *